United States Patent
Dadhia et al.

(10) Patent No.: US 7,886,351 B2
(45) Date of Patent: Feb. 8, 2011

(54) NETWORK AWARE FIREWALL

(75) Inventors: Rajesh K. Dadhia, Redmond, WA (US);
Fabien J. Royer, Redmond, WA (US);
Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/455,328

(22) Filed: Jun. 19, 2006

(65) Prior Publication Data
US 2007/0294755 A1 Dec. 20, 2007

(51) Int. Cl.
*H04L 29/06* (2006.01)
(52) U.S. Cl. .................................... 726/11
(58) Field of Classification Search ............ 726/11
See application file for complete search history.

(56) References Cited

U.S. PATENT DOCUMENTS

| | | | |
|---|---|---|---|
| 6,141,749 A | 10/2000 | Coss et al. | |
| 6,154,775 A | 11/2000 | Coss et al. | |
| 7,249,376 B2 * | 7/2007 | Wesinger et al. | 726/11 |
| 7,284,267 B1 * | 10/2007 | McArdle et al. | 726/11 |
| 2003/0120955 A1 | 6/2003 | Bartal et al. | |
| 2004/0268149 A1 | 12/2004 | Aaron | |
| 2005/0005165 A1 | 1/2005 | Morgan et al. | |
| 2005/0010765 A1 | 1/2005 | Swander et al. | |
| 2005/0078624 A1 | 4/2005 | Shu et al. | |
| 2005/0177869 A1 | 8/2005 | Savage et al. | |
| 2005/0229246 A1 | 10/2005 | Rajagopal et al. | |
| 2005/0268332 A1 | 12/2005 | Le et al. | |
| 2006/0010491 A1 | 1/2006 | Prigent et al. | |
| 2006/0021020 A1 | 1/2006 | Coley et al. | |
| 2006/0059551 A1 | 3/2006 | Borella | |
| 2006/0282878 A1 * | 12/2006 | Stanley et al. | 726/1 |

OTHER PUBLICATIONS

"NetworkTester", http://advanced.comms.agilent.com/networktester/docs/whitepapers/evaluating-firewall-perf.htm.
Hoskins, Robert, "Integrated User-Aware Mobile Firewall Uniquely Enforces Mobile Security Policies for Corporate Wi-Fi Access", http://www.bbwexchange.com/publications/newsw.
"Beyond the Firewall: Using Layered Security Strategy to Address Internal Security Threats", http://security.ittoolbox.com/pub/JM021303.pdf.
"eTrust Firewall—Bulletproof FirewallTM", http://www.gmasterinc.com/ca-pdf/eTrust-firewall.pdf.

* cited by examiner

*Primary Examiner*—Gilberto Barron, Jr.
*Assistant Examiner*—Samson Lemma

(57) ABSTRACT

A system and method for a network aware firewall is disclosed. The method includes accessing a first network connection from a client computer system and determining whether the first network connection is public or private. The method further includes dynamically modifying security parameters associated with a firewall local to the client computer system in response to determining whether the network connection is public or private.

14 Claims, 6 Drawing Sheets

500a

You Have Made A New Connection. Is this connection:

Public
502

Private
504

To help protect your computer, the firewall has blocked some features of this program. Do you want to keep blocking this program?

Keep Blocking
512

Ask Later
515

Unblock
514

[X] Unblock for private networks only

FIG. 5B

NETWORK AWARE FIREWALL

BACKGROUND

Firewalls filter traffic flowing between two or more networks. Typically these devices are routers connecting a public (e.g., untrusted) network and one or more private (e.g., trusted) networks. These types of firewalls are called an edge firewalls. As more personal computers connect to the public networks such as the Internet, host firewalls (e.g., personal firewalls local to the client computer system) became a necessary component of a host protection strategy. Host firewalls help reduce the available attack surface against malware and malicious entities on the Internet by blocking unsolicited traffic directed toward computers. In addition, host firewalls give an administrator a way to enforce policy on the system by creating an allow-list (or do-not-allow-list) of applications that can be allowed (or blocked) from listening on (or connecting to) the network.

As mobile computing becomes widespread, users attach their computers to untrusted public networks (e.g., via public WiFi) in order to get access to the Internet, which poses a security risk for the users. In most cases, firewall exceptions (e.g., allow and do-not-allow policies) for services and applications that are enabled on the user's home networks (e.g., file sharing) also remain enabled when these users connect to unprotected public networks (such as a coffee shop or the airport WiFi). Conventional firewall systems are not "smart" enough to understand the type of network the computer is connected to and disable the exceptions that are not needed on unprotected public networks.

Once a user has created a list of firewall "exceptions" that are allowed to listen for incoming connections, a conventional host firewall makes sure that no other unsolicited traffic will get inside the computer. Most conventional host firewalls enforce allow/block rules in a fairly static manner, for example, once an application is allowed/blocked it continues to be allowed/blocked regardless of the environment a computer could be operating under.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one embodiment, a computer implemented method for a network aware firewall is disclosed. The method includes accessing a first network connection from a client computer system and determining whether the first network connection is public or private. The method further includes dynamically modifying security parameters associated with a firewall local to the client computer system in response to determining whether the network connection is public or private

DESCRIPTION OF THE DRAWINGS

The accompanying drawings, which are incorporated in and form a part of this specification, illustrate embodiments of the technology for a network aware firewall, together with the description, serve to explain principles discussed below:

FIG. 5A is an illustration of an exemplary user interface for generating a network profile for a new network connection in accordance with embodiments of the present technology for a network aware firewall.

FIG. 5B is an illustration of an exemplary user interface 500a for blocking program features in accordance with embodiments of the present technology for a network aware firewall.

The drawings referred to in this description should be understood as not being drawn to scale except if specifically noted.

DETAILED DESCRIPTION

Reference will now be made in detail to embodiments of the present technology for a network aware firewall, examples of which are illustrated in the accompanying drawings. While the technology for a network aware firewall will be described in conjunction with various embodiments, it will be understood that they are not intended to limit the present technology for a network aware firewall to these embodiments. On the contrary, the presented technology for a network aware firewall is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for a network aware firewall. However, the present technology for a network aware firewall may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "accessing", "blocking", "forming", "identifying", "enabling", "modifying", "comparing", "classifying", "reporting", "configuring", "determining", "prompting", and "incrementing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for a network aware firewall is also well suited to the use of other computer systems such as, for example, optical and mechanical computers. Additionally, it should be understood that in embodiments of the present technology for a network aware firewall, one or more of the steps can be performed manually.

Examples Computer System Environment

Figure 1:
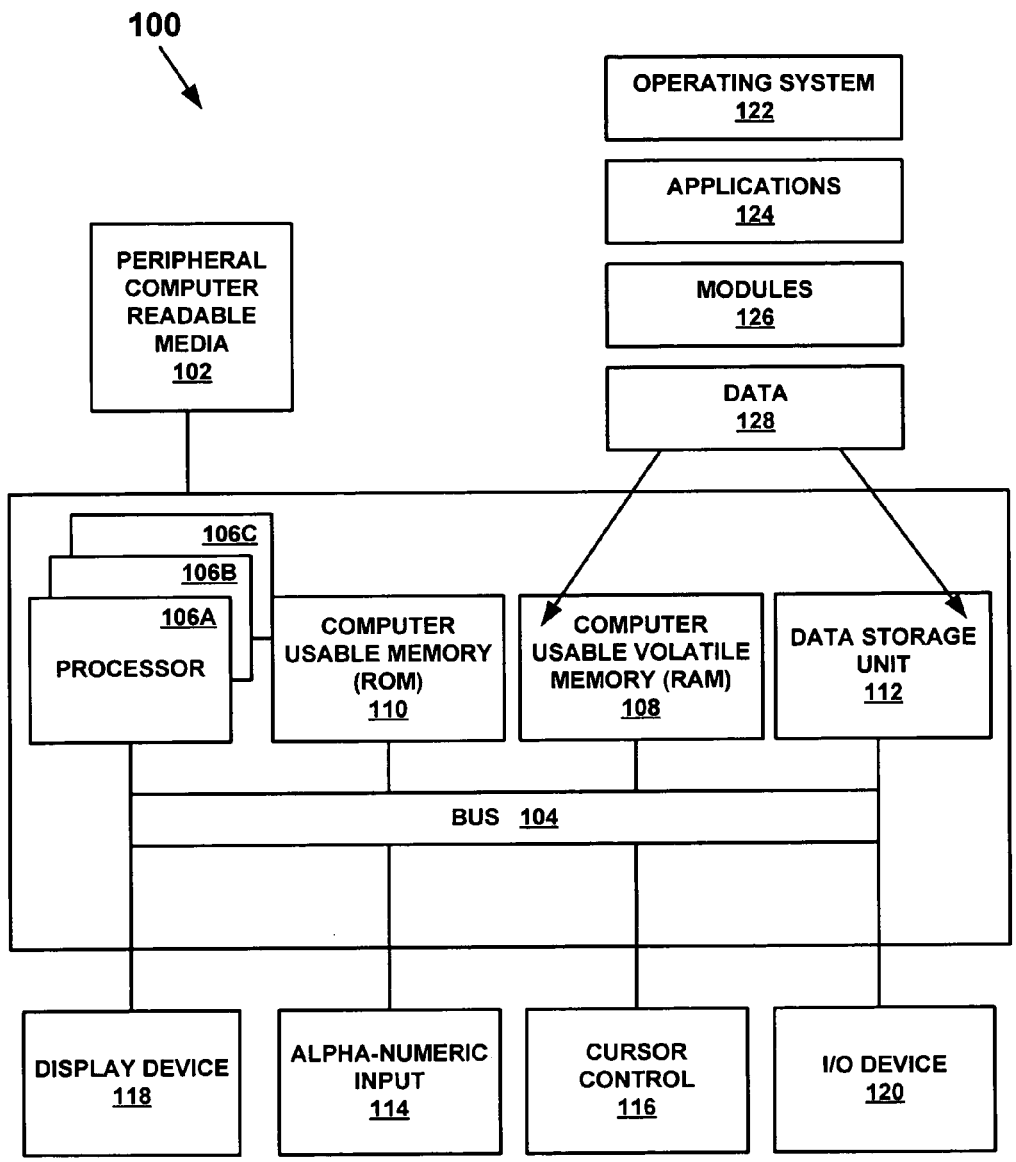
FIG. 1 is a diagram of an exemplary computer system used in accordance with embodiments of the present technology for a network aware firewall.

With reference now to FIG. 1, portions of the technology for a network aware firewall are composed of computer-readable and computer-executable instructions that reside, for example, in computer-usable media of a computer system. That is, FIG. 1 illustrates one example of a type of computer that can be used to implement embodiments, which are discussed below, of the present technology for a network aware firewall.

FIG. 1 illustrates an exemplary computer system 100 used in accordance with embodiments of the present technology for a network aware firewall. It is appreciated that system 100 of FIG. 1 is exemplary only and that the present technology for a network aware firewall can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for a network aware firewall is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for a network aware firewall, for example, is stored as an application 124 or module 126 in memory locations within RAM 108 and memory areas within data storage unit 112.

Overview of the Present Technology for a Network Aware Firewall

Embodiments of the present technology for a network aware firewall are directed towards mobile computing. For example, as increasing number of computers become mobile in "home" and "enterprise", they connect to different types of networks at different times. Host firewalls (e.g., local to the computer system) have a simple allow/block policy for applications, meaning once an application is allowed to listen on the network it's added to the firewall policy. This change is fairly static. The application is allowed to listen regardless of the network the computer is connecting; this is true even when the computer connects to multiple networks where one connection is private (e.g., trusted) and the other is public (e.g., untrusted). This is illustrated through FIG. 2 below. Embodiments of the present technology for a network aware firewall dynamically modify firewall security settings according to the type of network the computer system is connected to which provides seamless firewall protection when switching from one connection to another.

Embodiments of the present technology for a network aware firewall are also directed towards parallel connectivity. Mobile laptops, as well as stationary desktops can use remote connectivity technologies (e.g., VPN) and can be connected to different types of networks simultaneously. For example, a roaming computer can be connected to the "enterprise" network from a public place via a VPN connection. Another example is an "enterprise" desktop can be connected to a home network via a firewall traversal interface/personal VPN. In the first case, the computer is primarily connected to a public (e.g., untrusted) network and further connects to an inside (e.g., trusted) network. In the second case, the situation is reversed.

The firewall of the present technology stores and enforces network specific policies. As a computer roams between multiple networks (e.g., one at a time or simultaneously), network profiles for those networks are created and/or activated and the firewall dynamically applies those policies according to which network the computer is connected to.

In one embodiment, a firewall keeps two sets of firewall policies locally. The first policy is associated with private (e.g., trusted) networks. Examples of a private network include home, a virtual private network (VPN) to a trusted network, a trusted Intranet, etc. The second policy is associated with public (e.g., untrusted) networks. Examples of public networks include WiFi at a local coffee shop, an airport connection, etc. In one embodiment, the private policy can be only enabled when connected to the home network directly or through a VPN—whether the network connected to is home or not can be determined automatically by analyzing the network attributes—and at all other times the public profile is enabled. This provides the simplest solution to users that are not interested in managing the profiles. In another embodiment, the user is asked whether a network is "public" or "private" every time a network connection is made.

In another embodiment, the firewall profiles are modifiable, meaning a user can establish any number of network specific profiles and can establish "exceptions" for specific networks. An exception is rule that either allows or denies access of an application or service on the client computer system.

Exemplary Implementation of the Technology

Figure 2:
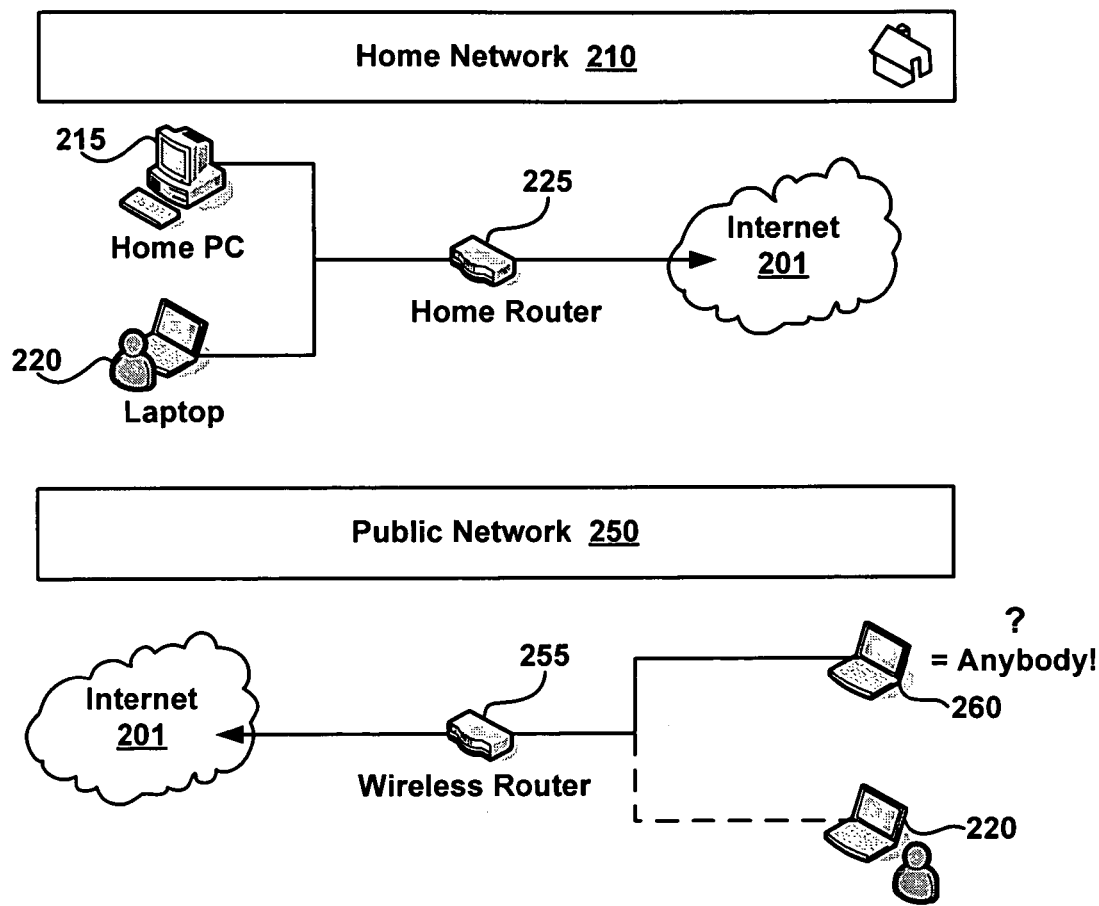
FIG. 2 is a diagram of an exemplary home (e.g., private) network and an exemplary public (e.g., public) network used in accordance with embodiments of the present technology for network aware firewall.

FIG. 2 is a diagram of an exemplary home network 210 and an exemplary public network 250 used in accordance with embodiments of the present technology for network aware firewall. When connected to a home network 110, a user may enable file sharing so that files may be shared between a laptop computer system 120 and a home PC desktop computer system 115. The home network can be considered safe, because the home router 125 may have a firewall that blocks malicious access attempts from the Internet 101.

When the laptop computer system 120 is then used in a public network (e.g., at a local coffee house), the file sharing enabled within the home network 110 should be disabled to prevent other computer systems 160 from accessing information and/or applications on the laptop computer system 120. Within the public network environment 150, the laptop is sharing the network with unknown computers. Also the security infrastructure in some public networks is largely non-existent.

Embodiments of the present technology for a network aware firewall dynamically modify security settings on the laptop 120 in response to the network the computer is connected to. For example, in the case described above, the firewall on the laptop 120 would disable file sharing when the laptop 120 is connected to the public network 150 and enable file sharing when the laptop 120 is connected to the home network 110.

Figure 3:
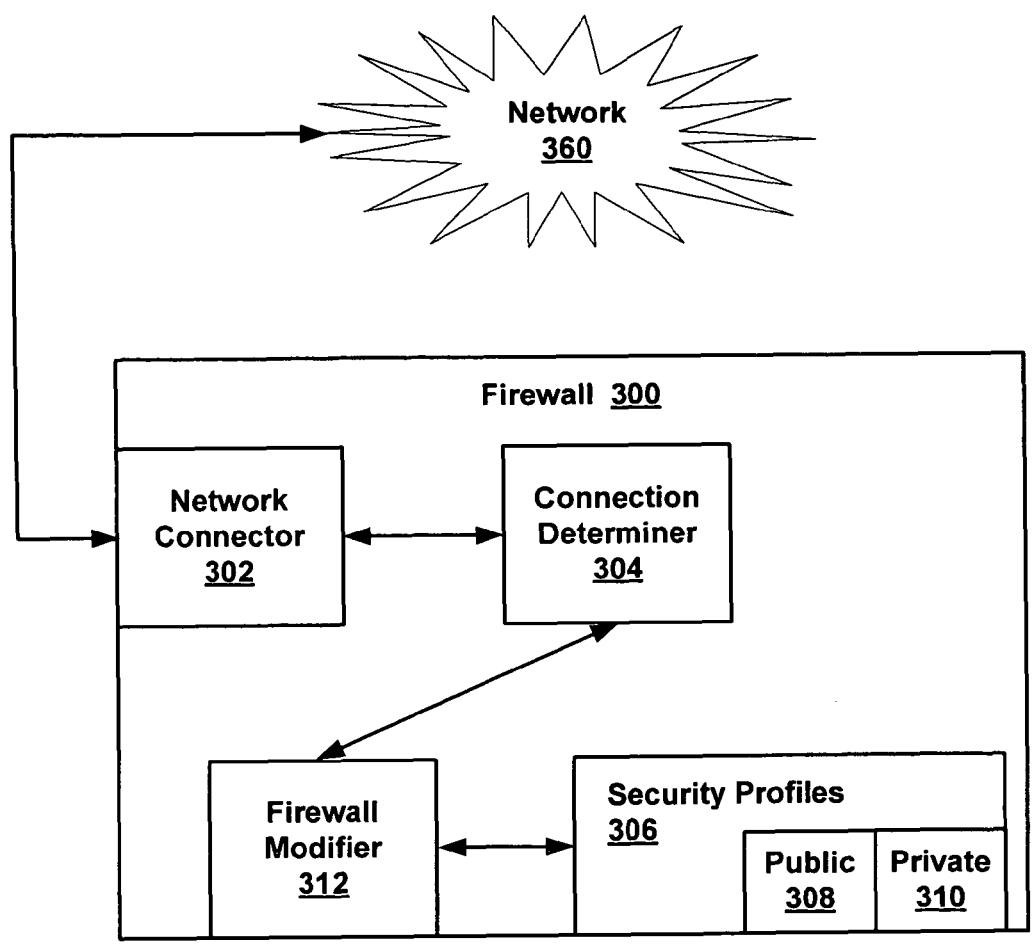
FIG. 3 is a block diagram of an exemplary firewall in accordance with embodiments of the present technology for network aware firewall.

FIG. 3 is an exemplary firewall 300 system in accordance with embodiments of the present technology for network aware firewall. It is appreciated that firewall 300 can be local to a computer system and can be implemented in hardware as well as software. Firewall 300 includes a network accessor 302 for accessing a network connection. A connection determiner 304 determines the type of the connection. For example, in one embodiment, the connection determiner 304 determines whether the connection is public or private. In another embodiment, the connection determiner 304 determines that the connection is to a unique network, e.g., one that has not been seen or used previously. In one embodiment, a network location awareness service is used to distinguish different networks.

In one embodiment of the present technology, the connection determiner 304 is notified by a helper API (application programming interface). The helper API notifies the connection determiner when a physical or virtual network interface comes up or goes down. In response, the firewall checks to see if a network profile is established for the particular connection. If there is an existing profile, the profile is enabled. If not, a new profile is created or a default (e.g., global) profile is enabled.

The firewall 300 further includes a firewall modifier 312 that modifies security policies associated with the firewall in response to the connection determiner 304 determining a connection type. For example, in response to the connection determiner 304 determining that a connection is public, the firewall modifier 312 accesses the security profiles 306 and enables the public security profile 308. In response to the connection determiner 304 determining that a connection is private, the firewall modifier 312 accesses the security profiles 306 and enables the private security profile 310. In one embodiment, the public security profile 308 is a default (e.g., global) profile which provides the most security.

It is appreciated that any number of security profile models can be used in accordance with the present technology for a network aware firewall. For example, a two firewall policy can be implemented wherein two different profiles can be used. The first profile is used for public networks and the second is used for private networks. In an unmanaged environment (e.g., the user does not modify security policies), the private profile is used primarily at home and the public profile is used everywhere else. In this example, it is assumed that all other networks are not to be trusted and that the home network is the only network to be trusted. In another embodiment, a standard profile is set. A standard profile is a profile that an administrator, for example, wants to enforce on both public and private networks. In this case, public and private profiles created for networks are merged with the standard profile with conflicts being resolved in favor of what is specified in the standard profile.

In one embodiment, a user selects whether a connection is "public" (not trusted) or "private" (trusted) every time a connection is made. In another embodiment, a plurality of network profiles can be simultaneously enforced. For example, if a computer is coupled to N networks, N or more different security profiles could be simultaneously implemented.

In a managed computer environment (e.g., managed by a system administrator), examples of profiles include a public profile, a private profile and a corporate profile, for example. The corporate profile can be used in the case of a domain-joined network wherein a user may connect from a first network to a second network (e.g., VPN from work to home or vice versa). In the case of a domain-joined network, a standard profile can be established by a system administrator, for example. The standard profile can be merged with the public and private profiles for the specific network interfaces that are not connected to the corporate (or home) network, for example.

In addition to the two policy model described above, an n+1 model can be used where the firewall maintains distinct policies per network. For example, as a computer connects to arbitrary networks, the network determiner creates new network profiles and the firewall is made aware of the new network profile. In addition to maintaining the per network policy, the firewall can also maintain a global policy which is applicable to any network the computer connects to. For N networks, the firewall maintains N profiles and a global profile, hence the name N+1 firewall policy model.

In one embodiment, network profiles are virtual system objects. They can be created as a computer connects to different networks. For example, a laptop that has connected to a home network, a coffee shop network and an airport network at different times can have as many as three network profiles while a desktop computer system may only have one network profile (since it is stationary). The desktop however can VPN to different networks in which case it can have a separate network profile for each such network.

It is appreciated that a computer can have both physical (e.g., wired, wireless) and virtual (e.g., VPN) interfaces. Physical interfaces are hardware interfaces, for example, a LAN (Local Area Network) interface using an Ethernet card or a wireless interface. Virtual interfaces are created manually by system administrators, for example, VPN interfaces or some other dial on demand interface. The exemplary firewall of the present technology maps the network interfaces (physical or virtual) connected to a system to network profiles and implements them at the firewall.

Figure 4:
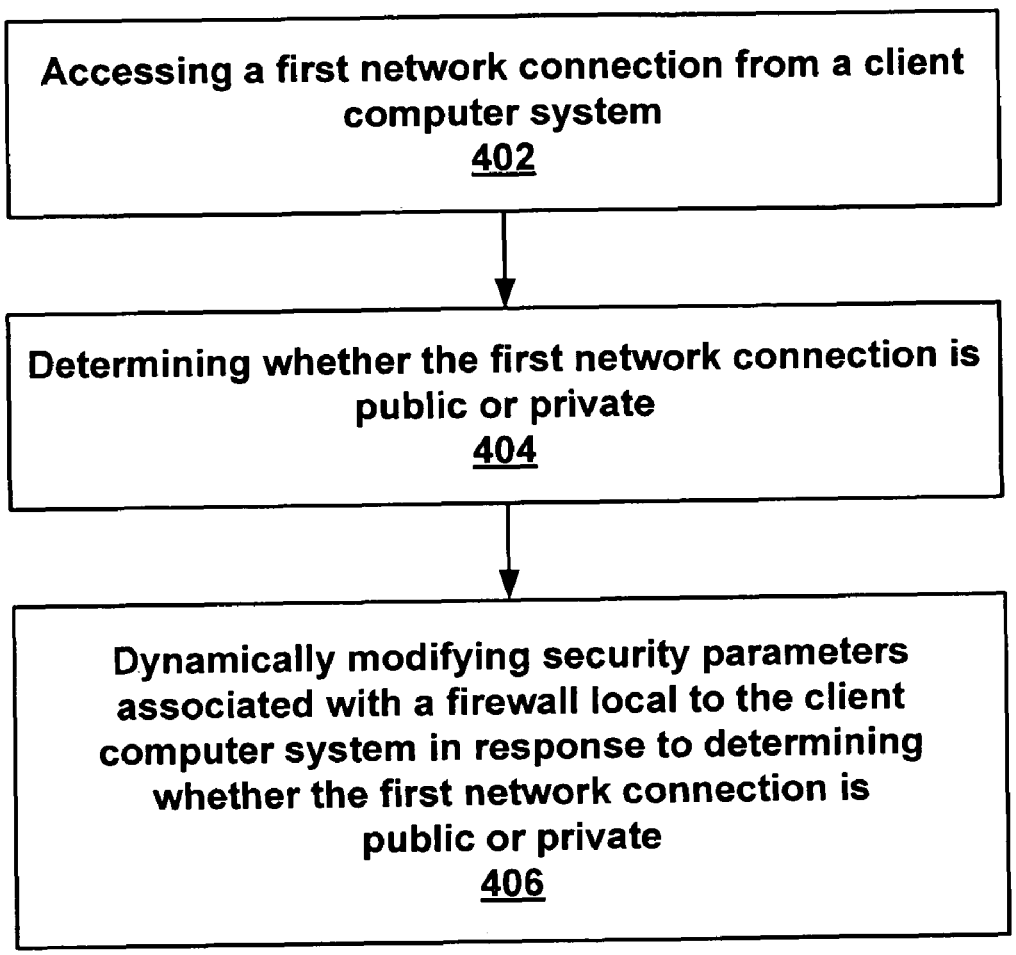
FIG. 4 is a data flow diagram of an exemplary computer implemented method for a network aware firewall in accordance with embodiments of the present technology for network aware firewall.

FIG. 4 is a data flow diagram of an exemplary computer implemented method 400 in accordance with embodiments of the present technology for network aware firewall. At 402, method 400 includes accessing a first network connection from a client computer system. As stated above, the connection can be a physical or virtual network connection.

At 404, method 400 includes determining whether the first network connection is public or private. As stated above, any number of methods for determining whether the network connection is public or private can be used. For example, a network location awareness (NLA) service can be used to determine network properties, such as location.

At 406, method 400 includes dynamically modifying security parameters Associated with a firewall local to the client computer system in response to determining whether the first network connection is public or private. For example, 406 can include automatically modifying the firewall security parameters to a public profile in response to determining the first network is public and vice versa. 406 can also include enabling a default (e.g., global) security profile (e.g., a public security profile) in response to detecting a network connection other than a "home" network.

In one embodiment, a security policy restricts actions of a particular service and/or application on the client computer system to prevent malicious access from others coupled to the network. Firewall exceptions can be created for individual networks and can also be automatically disabled in 406 in response to detecting a network connection that does not have a network profile.

Exemplary Scenarios of the Present Technology

The following exemplary scenarios are provided as examples of the present technology for a network aware firewall. The first scenario (referred to as the Abby scenario) relates to enabling and disabling file sharing when connecting to different networks. Suppose Abby attaches her laptop to her home network. Abby then opens the file sharing port on the laptop to share files between her laptop and her desktop. Abby then takes her laptop to a coffee shop and connects to the wireless network available. Embodiments of the present technology for a network aware firewall can automatically disable file sharing in response to determining the laptop is connected to a public network.

Scenario two (referred to as the Ichiro scenario) relates to a system administrator that wants to prevent system users from modifying firewall parameters. Suppose Ichiro has deployed a host firewall in his enterprise network and sets the policy for the desktops. Ichiro wants to discourage the users of the desktops from changing the firewall policies. Embodiments of the present technology for a network aware firewall can disable a firewall control panel (e.g., firewall user interface) for users other than administrators or any other authorized user.

Scenario three relates to creating "exceptions" to firewall policies. Suppose Ichiro has deployed a host firewall in his enterprise network and has set the policy for the laptops. Ichiro knows that users of the laptops can attach those computers to outside networks (e.g., networks away from "home") when they are roaming, so he wants to deploy a stricter default firewall policy when users are connected to networks other than the "home" network. Embodiments of the present technology for a network aware firewall can create a default (e.g., global) firewall policy and enable the default firewall policy when the computer is connected to networks other than the "home" network.

Scenario four relates to virtual networks. Suppose Ichiro has deployed a host firewall in his enterprise network and configured the policies for the desktops. When users are roaming and VPN into a corporate network, Ichiro wants those computers to have a Domain policy only on the VPN interface and not on the physical interface that was used to establish the VPN. Further, Ichiro is aware of the firewall traversal feature that can be used by users to connect to an outside network from the corporate desktop. Ichiro wants to make sure that the firewall exceptions created by him on the corporate desktops are only available to computers on the corporate network. Embodiments of the present technology for a network aware firewall can establish and enforce multiple network specific security policies simultaneously and can distinguish between virtual and physical network connections.

Exemplary User Experience of the Present Technology

FIG. 5A is an illustration of an exemplary user interface 500a for generating a network profile for a new network connection in accordance with embodiments of the present technology for a network aware firewall. After a user connects a computer to a new network (e.g., one that does not have an existing network profile), in one embodiment, they are. prompted to classify the new connection as public 502 or private 504. The selection can be stored in a network profile associated with the connection. The network profile maps firewall security policies to particular network connections. In one embodiment, users are allowed to modify the settings for a particular network connection.

FIG. 5B is an illustration of an exemplary user interface 500a for blocking program features in accordance with embodiments of the present technology for a network aware firewall. When a new application is run and it tries to listen on the network, in one embodiment, a user is asked whether or not they want to allow the program to listen on the network. If the answer is yes, an exception is created in the network specific firewall security profile associated with that connection. The user may also be asked whether they are allowing the listening application for private networks only or both private and public networks. Based on the user selection, an exception will be created to the corresponding firewall policy profiles. For example, in FIG. 6, the user may select box 512 to block the application from listening or select box 514 to unblock the application from listening. A check box can be selected to unblock only for private networks, in one embodiment.

In one embodiment, for an enterprise network, a domain administrator continues to have the option to define whether local users can change firewall settings from a firewall user interface. If the administrator disables the local-edit functionality, the UI for private as well as public exceptions is not accessible to users other than the administrators.

Embodiments of the present technology, for a network aware firewall improve firewall protection against malicious activity even when a user connects a computer to multiple networks over a course of time or simultaneously. The exemplary network aware firewall of the present technology dynamically modifies firewall security policies in response to determining what network(s) the computer system is connected to. The firewall provides flexibility by allowing users to customize profiles for individual connections. The firewall also protects users that are not interested in customizing profiles but still want to be protected by automatically enabling a public security profile when outside of a private network.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for a network aware firewall, the method comprising:
    accessing a first network through a first virtual network interface from a client computer system;
    determining whether the first network is a first network type or a second network type, the first network type different than the second network type; and
    creating a first set of security parameters associated with a first firewall local to the client computer system in response to determining whether the first network is the first network type or the second network type, wherein the first set of security parameters comprises a global security profile and a concurrently applied first network specific profile if it is determined that the first network is the first network type, and wherein the first set of security parameters comprises the global security profile and a concurrently applied second network specific profile if it is determined that the first network is the second network type, wherein the global security profile is different than the first network specific profile and the second network specific profile and wherein the first network specific profile is different than the second network specific profile, wherein creating the first set of security parameters comprises:
        comparing one or more global security parameters associated with the global security profile with one or more network specific security parameters associated with at least one of the first network specific profile and the second network specific profile,
        identifying a conflict between at least one global security parameter and at least one network specific security parameter, and
        resolving the conflict in favor of either the conflicting global security parameter or the conflicting network specific security parameter.

2. The computer implemented method as described in claim 1, wherein the first network type is public and wherein the second network type is private.

3. The computer implemented method as described in claim 1, wherein creating the first set of security parameters comprises inhibiting file sharing in response to determining that the network is the first network type and allowing file sharing in response to determining that the network is the second network type.

4. The computer implemented method as described in claim 1 comprising:
    accessing a second network through at least one of a physical network interface and a second virtual network interface from the client computer system, the second network and first network accessed concurrently;
    determining whether the second network is a third network type or a fourth network type; and
    while substantially maintaining the first set of security parameters, dynamically modifying a second set of security parameters associated with a second firewall local to the client computer in response to determining whether the second network is the third network type or the fourth network type.

5. The computer implemented method as described in claim 1 comprising:
    prompting a user to classify the first network as the first network type or the second network type.

6. Instructions on a computer-usable device wherein the instructions when executed cause a computer system to perform a method for network aware security, the computer-implemented method comprising:
    connecting to a first network from a client computer system through a virtual network interface;
    determining whether the first network is a first network type or a second network type, the first network type different than the second network type;
    identifying a set of one or more global security parameters that may be applied regardless of the determined network type;
    identifying a set of one or more network specific parameters that are dependent upon the determined network type;
    resolving a conflict between an identified global security parameter and an identified network specific parameter such that at least one of the conflicting global security parameter and the network specific parameter are not applied; and
    concurrently applying the remaining global security parameters and the remaining network specific parameters after the conflict is resolved.

7. The computer implemented method as described in claim 6 comprising:
    altering at least one of the applied global security parameters and the applied network specific parameters, wherein the altering comprises:
    prompting a user to create a firewall exception if, before altered, at least one of the applied global security parameters and the applied network specific parameters inhibits a program from listening on the first network.

8. The computer implemented method as described in claim 6 comprising:
    prompting a user to classify the first network as the first network type or the second network type, wherein the first network type is public and the second network type is private.

9. A system for a network aware firewall comprising:
    a connection determiner configured to determine whether a first connection through a virtual network interface is a first network type or a second network type; and
    a firewall modifier configured to dynamically modify a first set of security parameters associated with a firewall local to the client computer system in response to determining whether the first connection is the first network type or the second network type, wherein the first set of security parameters comprises a global security profile and a concurrently applied first network specific profile if it is determined that the first connection is the first network type, and wherein the first set of security parameters comprises the global security profile and a concurrently applied second network specific profile if it is determined that the first connection is the second network type, wherein the global security profile is different than the first network specific profile and the second network specific profile and wherein the first network specific profile is different than the second network specific profile, wherein dynamically modifying the first set of security parameters comprises:
- comparing one or more global security parameters associated with the global security profile with one or more network specific security parameters associated with at least one of the first network specific profile and the second network specific profile,
- identifying a conflict between at least one global security parameter and at least one network specific security parameter, and
- resolving the conflict in favor of either the conflicting global security parameter or the conflicting network specific security parameter, wherein at least one of the connection determiner, and the firewall modifier comprises a microprocessor.

10. The system as described in claim 9 comprising:
a firewall exception handler configured to enable or disable a firewall exception associated with an application in response to determining whether the first connection is the first network type or the second network type.

11. The system as described in claim 9 comprising:
a firewall exception handler configured to enable or disable a firewall exception in response to user input.

12. The system as described in claim 9, wherein the firewall modifier is configured to resolve a conflict between at least two network security parameters in favor of the conflicting global security parameter that is applied regardless of the determined network type.

13. The computer implemented method as described in claim 1, wherein it is determined whether the first network is the first network type or the second network type based upon a network location awareness service.

14. The computer implemented method as described in claim 13, wherein the network location awareness service is configured to determine whether the first network is the first network type or the second network type based upon a characteristic of the network other than an internet protocol address.

* * * * *